(12) United States Patent
Rajasekharan et al.

(10) Patent No.: US 11,537,713 B2
(45) Date of Patent: Dec. 27, 2022

(54) RANSOMWARE ATTACK ONSET DETECTION

(71) Applicant: Code42 Software, Inc., Minneapolis, MN (US)

(72) Inventors: Ajaykumar Rajasekharan, Longmont, CO (US); Matthew Mills Parker, Denver, CO (US); Daniel L. Sullivan, Denver, CO (US)

(73) Assignee: CRASHPLAN GROUP LLC, New York, NY (US)

( * ) Notice: Subject to any disclaimer, the term of this patent is extended or adjusted under 35 U.S.C. 154(b) by 618 days.

(21) Appl. No.: 15/666,906

(22) Filed: Aug. 2, 2017

(65) Prior Publication Data

US 2019/0042744 A1 Feb. 7, 2019

(51) Int. Cl.
*G06F 21/56* (2013.01)
*G06F 21/55* (2013.01)

(52) U.S. Cl.
CPC .......... *G06F 21/565* (2013.01); *G06F 21/554* (2013.01); *G06F 2221/034* (2013.01)

(58) Field of Classification Search
CPC . G06F 21/565; G06F 21/554; G06F 2221/034
See application file for complete search history.

(56) References Cited

U.S. PATENT DOCUMENTS

| | | | | |
|---|---|---|---|---|
| 7,134,041 B2 * | 11/2006 | Murray | ................ | G06F 11/1451 714/4.1 |
| 8,181,251 B2 * | 5/2012 | Kennedy | ................ | G06F 21/563 709/201 |
| 8,695,095 B2 * | 4/2014 | Baliga | ................... | G06F 21/568 726/24 |
| 8,918,878 B2 * | 12/2014 | Niemelä | ............... | G06F 21/568 726/22 |
| 9,792,289 B2 * | 10/2017 | Reininger | ............. | G06F 16/156 |
| 9,935,973 B2 * | 4/2018 | Crofton | ................... | G06F 21/64 |
| 10,061,516 B2 * | 8/2018 | Wakchaure | ........... | G06F 3/0655 |
| 2005/0172339 A1 * | 8/2005 | Costea | .................. | G06F 21/563 726/22 |
| 2016/0185800 A1 * | 6/2016 | Ren | ...................... | C07D 473/34 514/81 |
| 2017/0046512 A1 * | 2/2017 | Kedma | ................... | G06F 21/56 |

(Continued)

FOREIGN PATENT DOCUMENTS

WO    WO-2022002405 A1 * 1/2022

*Primary Examiner* — Sarah Su
(74) *Attorney, Agent, or Firm* — Dorsey & Whitney LLP (57) ABSTRACT

A method of detecting the onset of a ransomware attack is presented. In an example embodiment, file backup metadata for each of a plurality of computing devices is accessed and analyzed to detect anomalous file backup activity of individual ones of the computing devices. A determination is made as to whether the detected anomalous file backup activity of at least some of the computing devices is correlated in time. File description metadata for each of the computing devices is also accessed and analyzed to identify files in the computing devices that are anomalous to other files in the computing devices. A determination whether a ransomware attack has begun is based on a determination that the detected anomalous file backup activity of at least some of the computing devices is correlated in time, as well as on the identified anomalous files.

21 Claims, 8 Drawing Sheets

(56) References Cited

U.S. PATENT DOCUMENTS

2017/0104776 A1* 4/2017 Halfon ................ G06F 11/1446
2017/0329660 A1* 11/2017 Salunke .............. G06F 11/3409
2021/0279330 A1* 9/2021 Mitra .................. G06F 11/1446

* cited by examiner

RANSOMWARE ATTACK ONSET DETECTION

TECHNICAL FIELD

Embodiments pertain to data processing. Some embodiments relate to detecting the onset of a ransomware attack.

BACKGROUND

The development and use of "ransomware" represents an emerging and widespread threat to computer data security. Generally, ransomware is a type of "malware" (malicious software) that, when executed on a computing device (e.g., a desktop or laptop computer), blocks the user of the device from accessing data stored thereon. Typically, the instigator of a ransomware attack will only allow the user to access the data after some sort of ransom (e.g., a payment in digital currency) is paid. In some examples, the user's access to the files is blocked by way of encrypting the files with a secret cryptographic key. In such cases, the files are decrypted, thus restoring the user's access to the files, only after the demanded ransom is paid.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

In the following description, for the purposes of explanation, numerous specific details are set forth in order to provide an understanding of various example embodiments of the present subject matter. It will be evident, however, to those skilled in the art, that example embodiments of the present subject matter may be practiced without these specific details.

Figure 1:
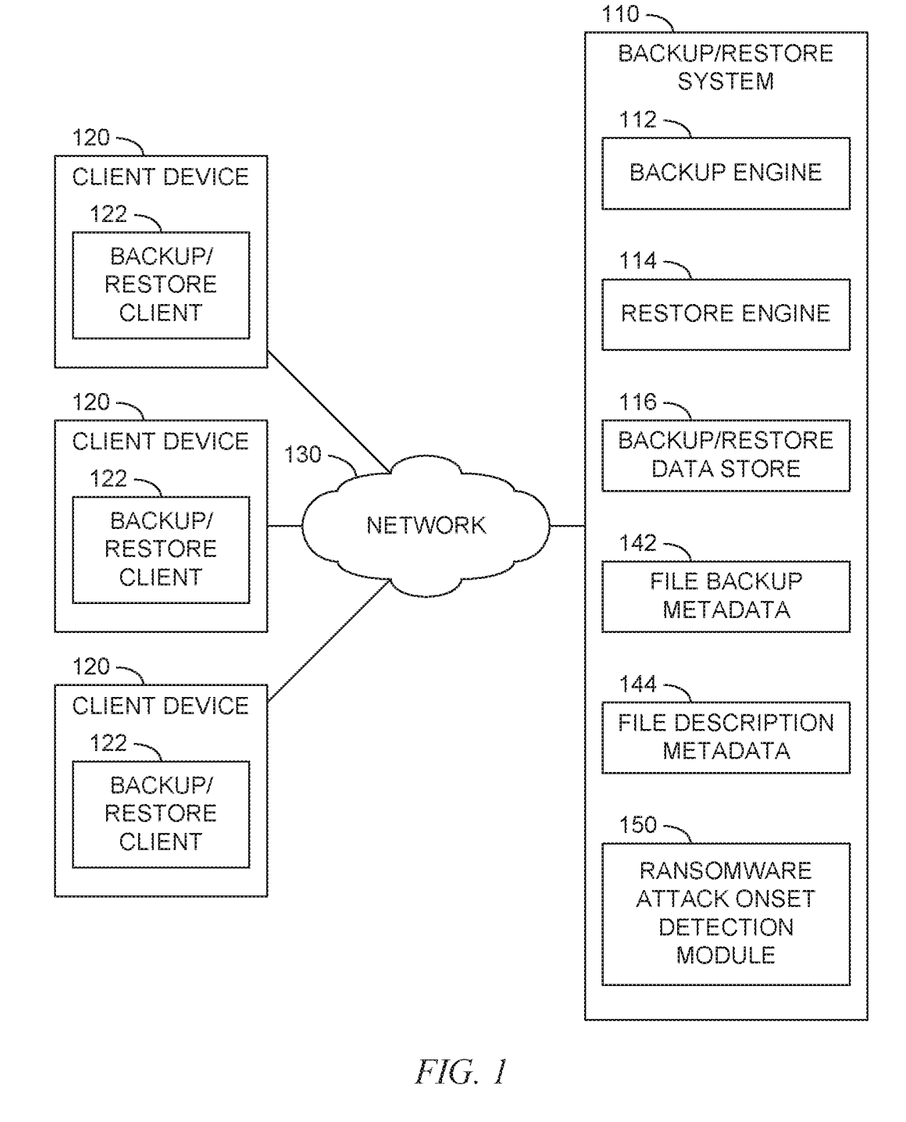
FIG. 1 is a block diagram of a plurality of client devices coupled via a communication network to an example file backup/restore system.

FIG. 1 is a block diagram of a plurality of client devices 120 coupled via a communication network 130 to an example file backup/restore system 110. In an example embodiment, each of the client devices 120 may be a computing or communication system or device storing, or possessing access to, electronic files and related structures (e.g., electronic file folders) that may be backed up and subsequently restored via the communication network 130 using the backup/restore system 110, such as in the case of a failure of one or more data storage devices (e.g., magnetic disk drives, optical disk drives, flash storage devices, etc.). Example embodiments of the client devices 120 may include, but are not limited to, desktop computers, laptop computers, tablet computers, and smartphones. While FIG. 1 depicts three client devices 120, any number of client devices 120 may access the file backup/restore system 110 in example embodiments. In an example embodiment, the client devices 120 may be associated with a single organization (e.g., a corporation or governmental entity), a particular department of such an organization, a particular geographic area (e.g., a particular corporate site or building), and so forth, thus engendering some commonality among the client devices 120, and/or subsets thereof.

In example embodiments, the communication network 130 may include one or more of a wide area network (WAN) (e.g., the Internet), a wireless WAN (WWAN), a local area network (LAN), a wireless LAN (WLAN), a cellular data network (e.g., a third-generation (3G) or fourth-generation (4G) network), another communication connection, and/or combinations thereof.

As is described in greater detail below, in at least some example embodiments, the backup/restore system 110, by way of a ransomware attack onset detection module 150 employed therein, may detect the onset of a ransomware attack at one or more of the client devices 120 using data normally generated or acquired during file backup operations, and may also facilitate a restore operation of the affected data prior to the onset of the attack. In addition, the ransomware attack onset detection module 150 may help limit the scope of the attack to only a few client devices 120, thus restricting the potential effects of the attack. Consequently, the data security and privacy often associated with a backup/restore system 110 is maintained, as actual file contents are not distributed or perused to perform the ransomware onset detection operations described herein; only metadata regarding the files and associated backup operations are employed. Other aspects and characteristics of these example embodiments will be apparent in view of the following discussion.

As illustrated in FIG. 1, each client system 120 may execute a backup/restore client 122 (e.g., phone or tablet application ("app"), a client application, or the like) to facilitate communication with the backup/restore system 110 via the communication network 130, as well as to perform one or more functions on the client device 120 to facilitate backup and restore operations. To perform backup and restore operations for the client devices 120, the backup/restore system 110 may include, in example embodiments, a backup engine 112 to perform the backup operations, and a restore engine 114 to perform the associated restore operations of previously backed-up data. In example embodiments, the backup engine 112 may copy particular files, file directories, and the like, originally stored at a client device 120 that were selected by a user via the backup/restore client 122, to a storage location remote from the client device 120, such as a backup/restore data store 116 located at the backup/restore system 110, another client device 120, or elsewhere. Consequently, if one or more of the copied files and/or file directories at the client device 120 become inaccessible (e.g., due to a data storage device failure), the client device 120 may request the backup/restore system 110 via the backup/restore client 122 to restore the most recently backed-up version of the requested files to the client device 120, which would be accomplished by the restore engine 114.

In example embodiments, the backup engine 112, in conjunction with the client device 120, may initially copy all files designated by the user of the client device 120 to the backup/restore data store 116. Once all such files have been copied, the backup engine 112 may thereafter copy only files, or portions of files, that have been updated since the last backup operation for that file. To maintain a record of the backup operations that have been performed, as well as to identify which files have changed since the last backup operation so that those files may be backed up once more, the backup engine 112, in conjunction with the backup/restore client 122, may maintain file backup metadata 142 and file description metadata 144. As is discussed hereinafter, the ransomware attack onset detection module 150 may employ the file backup metadata 142 and the file description metadata 144 to perform its ransomware attack onset functionality.

Figure 2:
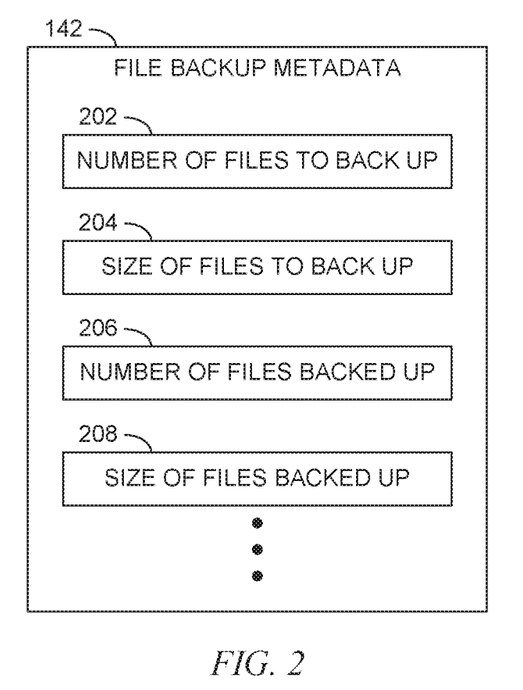
FIG. 2 is a graphical representation of an example embodiment of file backup metadata depicted in FIG. 1.

FIG. 2 is a graphical representation of an example embodiment of the file backup metadata 142 depicted in FIG. 1. In an example embodiment, the file backup metadata 142 may include file backup "summary" data that indicates the overall status of current and prior backup operations being performed via the backup engine 112 and the backup/restore client 122. As shown in the example embodiment of FIG. 2, the file backup metadata 142 may include, for each backup operation on a client device 120, a number of files remaining to be backed up 202, an overall size of the files remaining to be backed up 204, a number of files that have been backed up 206, and an overall size of the files that have been backed up 208. Other information aside from, or in addition to, that shown in FIG. 2 may be employed as the file backup metadata 142.

Figure 3:
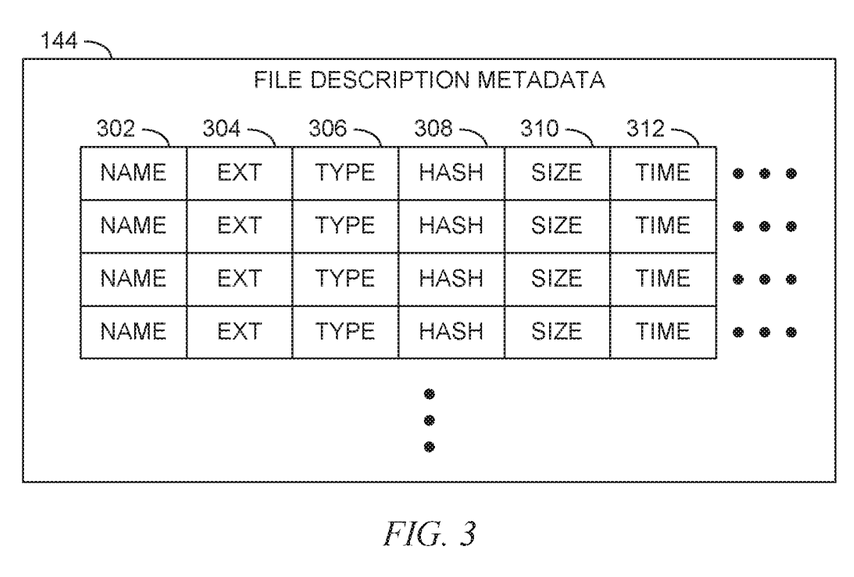
FIG. 3 is a graphical representation of an example embodiment of file description metadata depicted in FIG. 1.

FIG. 3 is a graphical representation of an example embodiment of the file description metadata 144 depicted in FIG. 1. In an example embodiment, the file description metadata 144 may include file "forensic" data, or data that includes information on each file that was encountered (e.g., via the backup/restore client 122) during a search of files on a client device 120 that are to be backed up due to those files being new or updated since the most recent backup operation. Further, the file description metadata 144 may include data that indicate those files that have been deleted from the client device 120 that are also to be removed from the backup/restore data store 116. As shown in the example embodiment of FIG. 3, the file description metadata 144 may include, for each file to be backed up on a client device 120, a file name 302, a file extension 304, a file type 306 (e.g., a file MIME (Multipurpose Internet Mail Extension) type), a file hash 308 (e.g., a result of mathematical processing of a file to generate a value that may serve as an identifier or "fingerprint" for the file), a file size 310, and one or more file times 312 (e.g., dates and/or times at which the file was created, read, updated, and/or deleted). Other information aside from, or in addition to, that shown in FIG. 3 may be employed as the file description metadata 144.

Figure 4:
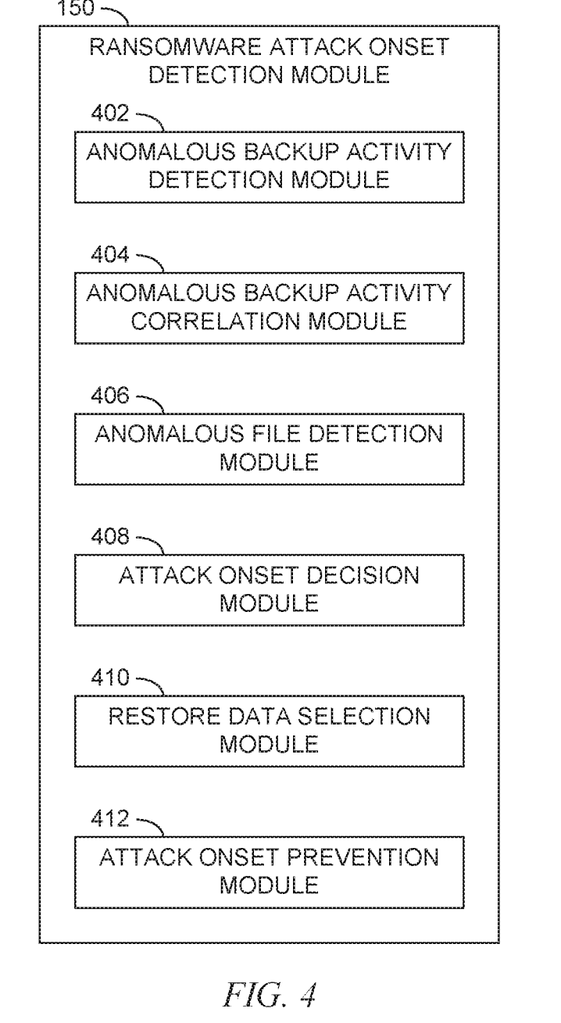
FIG. 4 is a block diagram of an example embodiment of a ransomware attack onset detection module depicted in FIG. 1.

FIG. 4 is a block diagram of an example embodiment of the ransomware attack onset detection module 150 depicted in FIG. 1. As shown in this embodiment, the ransomware attack onset detection module 150 includes an anomalous backup activity detection module 402, an anomalous backup activity correlation module 404, an anomalous file detection module 406, an attack onset decision module 408, a restore data selection module 410, and an attack onset prevention module 412. In other example embodiments, the ransomware attack onset detection module 150 may combine various modules into fewer numbers of modules, separate functionality into greater numbers of modules, and so on.

The anomalous backup activity detection module 402, in an example embodiment, is configured to analyze the file backup metadata 142 generated from the client devices 120 to detect anomalous backup activity on each of the client devices 120. For example, the anomalous backup activity detection module 402 may view a sudden increase or decrease in the number of files (or the total size of files) to be backed up, or the number of files (or the total size of files) that were recently backed up, as an indication that a corresponding sudden change (e.g., addition, deletion, and/or modification) of files has occurred on the client device 120, thereby possibly indicating ransomware activity, such as the unauthorized encrypting of files on the client device 120.

In an example embodiment, the anomalous backup activity detection module 402 accesses and analyzes the file backup metadata 142 for each client device 120 separately. In some examples, the anomalous backup activity detection module 402 may employ a separate analysis model, such as a machine learning model, for each client device 120 to determine whether anomalous backup activity has occurred on that particular client device 120. Such models may be based on prior backup activity on that client device 120, characteristics regarding the types of software being executed on that client device 120, characteristics regarding the type of client device 120 (e.g., desktop computer, laptop computer, tablet computer, or smartphone), characteristics regarding the user of the client device 120 (e.g., profession of the user, job title of the user, department in which the user works, and the like), and other information. In an example embodiment, one or more of the learning models may be a time-series model, in which the file backup metadata 142 for each client device 120 is analyzed as a time-based series of data items.

In other example embodiments, multiple such learning models for a client device 120 may be employed in parallel, the output of which may be subsequently combined to determine a particular confidence level that anomalous backup activity has occurred on that client device 120. For example, a majority of models indicating anomalous file backup activity may cause the anomalous backup activity detection module 402 to determine that anomalous backup activity has indeed occurred. In some example embodiments, the output of each such model may be weighted to facilitate a greater emphasis on the outcome by some models compared to others.

Figure 5:
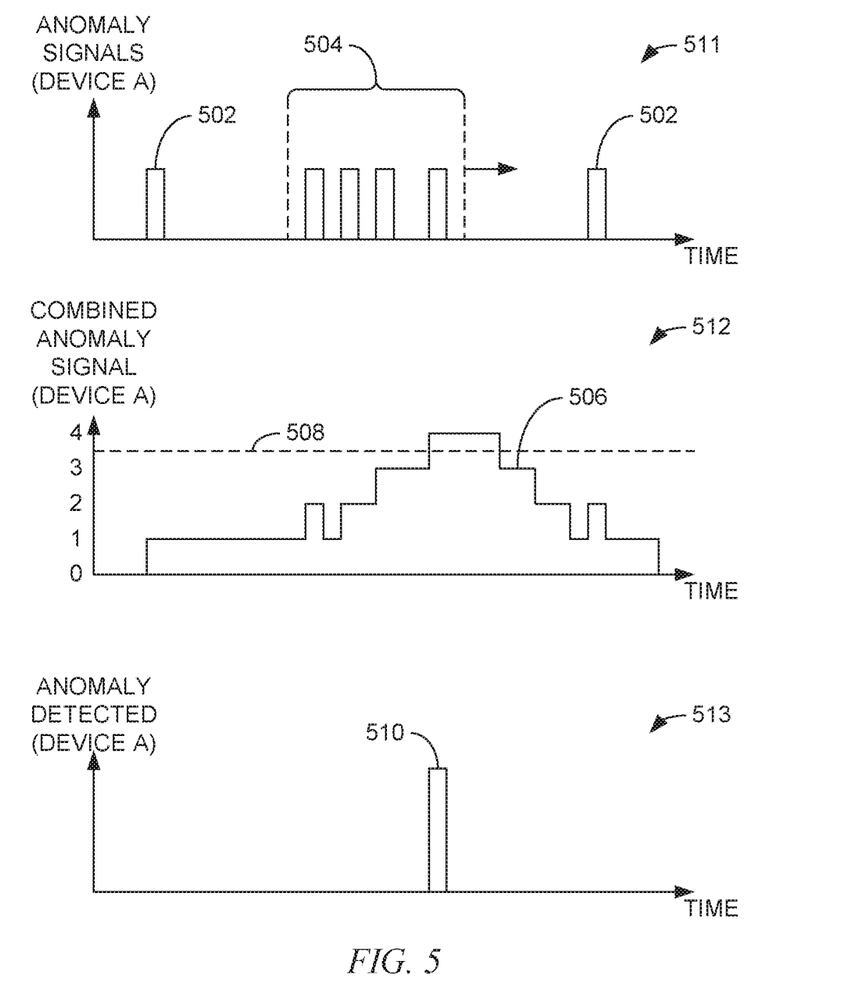
FIG. 5 is a set of graphs illustrating an example method of detecting a file backup anomaly on a client device.

Also in an example embodiment, the anomalous backup activity detection module 402 may internally generate signals indicating potentially anomalous backup activity on a particular client device 120 and employ a sliding time-based window that triggers an anomalous backup activity event when a threshold number of signals have been generated. For instance, FIG. 5 is a set of graphs 511, 512, 513 illustrating an example method of detecting a file backup anomaly on a client device 120 based on separate anomaly signals 502. In graph 511, a plurality of anomaly signals 502 are generated. Each anomaly signal 502 may indicate the detection (e.g., based on a machine learning model) that a particular backup event has been detected as being potentially anomalous, such as a sudden increase in the number or overall size of files updated since the most recent backup operation on the corresponding client device 120. More generally, in example embodiments, changes in file backup activity that may be detected as anomalous include, but are not limited to, an increase in a total number of new files backed up, an increase in a total size of new files backed up, an increase in a total number of previously existing files backed up, an increase in a total size of previously existing files backed up, a decrease in the total number of files backed up, and a decrease in the total size of files backed up. In each example embodiment, the surpassing of a predetermined threshold (e.g., by employing a machine learning model) may cause the generation of an anomaly signal 502.

The anomaly signals 502 may then be processed by way of a sliding time-based window 504 within which the number of anomaly signals 502 are counted to generate a combined anomaly signal 506, as shown in graph 512. If the combined anomaly signal 506 exceeds a threshold value 508 (e.g., 3.5), the anomalous backup activity detection module 402 may trigger an anomalous backup activity event 510, as depicted in graph 513.

Figure 6:
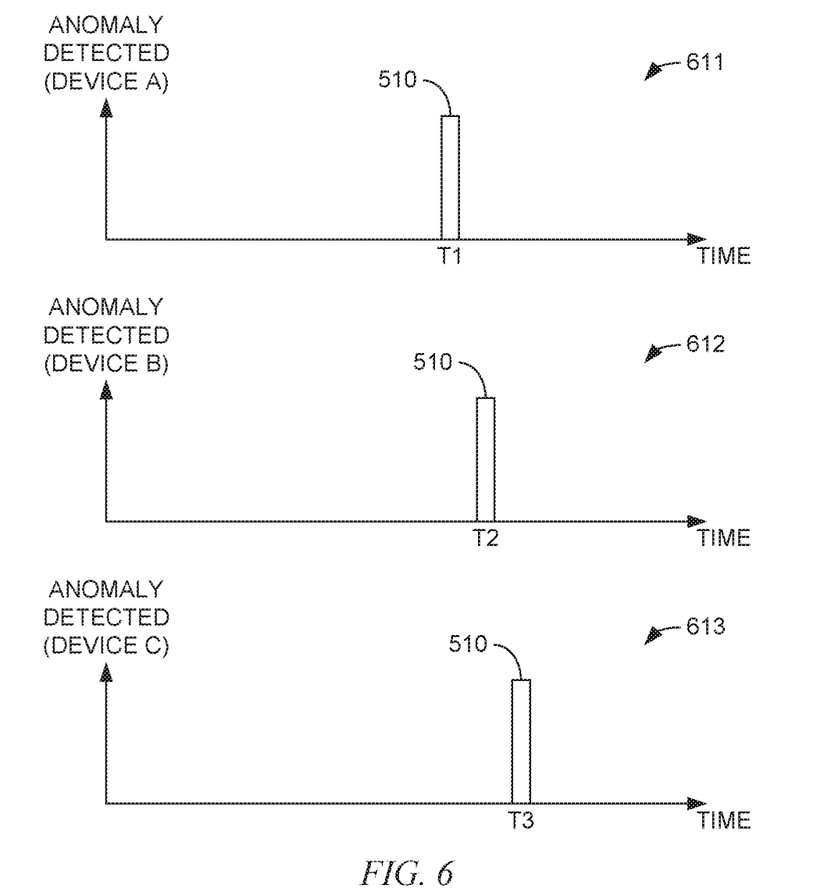
FIG. 6 is a set of graphs illustrating a correlation in time of a detected file backup anomaly in different client devices.

Returning to FIG. 4, the anomalous backup activity correlation module 404, in an example embodiment, is configured to determine whether the anomalous file backup activity of multiple client devices 120, as detected by the anomalous backup activity detection module 402, are correlated in time. For example, FIG. 6 is a set of graphs 611, 612, 613 illustrating a correlation in time of a detected file backup anomaly event 510 in different client devices 120. More specifically, as shown in graph 611, the anomalous backup activity detection module 402 has generated an anomalous backup activity event 510 for a first client device 120 "A" (e.g., via a machine learning model for the first client device 120) at time T1, an anomalous backup activity event 510 for a second client device 120 "B" (e.g., via a separate machine learning model for the second client device 120) at time T2, and an anomalous backup activity event 510 for a third client device 120 "C" (e.g., via a machine learning model for the third client device 120) at time T3. While the anomalous backup activity events 510 do not occur simultaneously, the anomalous backup activity correlation module 404 may conclude that the anomalous backup activity events 510 are correlated in time, as a ransomware attack may propagate from one client device 120 to another throughout an organization. In an example embodiment, the anomalous backup activity correlation module 404 may interpret a sequence of anomalous backup activity events 510 that are separated from each other by less than some predetermined minimum time period as being correlated in time, even if the total amount of elapsed time exceeds some number of hours or days.

In an example embodiment, the anomalous backup activity correlation module 404 may employ cohort analysis in its time correlation analysis. For example, the anomalous backup activity correlation module 404 may access information regarding each of the client devices 120 (e.g., the location of the client device 120, the particular user employing the client device 120, the organization or department associated with the client device 120, the types of software executed on the client device 120, and so on) and group the various client devices 120 according to similar characteristics for the client devices 120. The anomalous backup activity correlation module 404 may then determine whether anomalous backup activity events 510 generated by client devices 120 of a particular cohort group are correlated in time, thus potentially indicating the onset of a ransomware attack.

Returning again to the ransomware attack onset detection module 150 of FIG. 4, the anomalous file detection module 406, in an example embodiment, is configured to access and analyze the file description metadata 144 for each of the client devices 120 to identify files stored on a client device 120 that are anomalous relative to other files that are typically stored on the client device 120. More specifically, the anomalous file detection module 406, based on the filename 302, file extension 304, file MIME type 306, file hash 308, file size 310, file create/read/update/delete time 312, and the like for each of a plurality of files stored on the client device 120, may determine that one or more particular files on the client device 120 is anomalous relative to other files stored thereon. Moreover, the anomalous file detection module 406 may compare the file description metadata 144 across all client devices 120 (or across all client devices 120 of a particular cohort group) to identify particular client devices 120 having anomalous files, as well as identifying the particular anomalous files on those client devices 120.

In an example embodiment, the anomalous file detection module 406 may identify a file with a unique filename 302, file extension 304, or MIME type 306 as an anomalous file. In another example, the anomalous file detection module 406 may interpret such information in conjunction with an extremely large or small file size 310 to conclude that the associated file is anomalous. In addition, the anomalous file detection module 406 may interpret a file that has undergone changes in filename 203, file extension 304, file MIME type 306, file hash 308, and/or file size 310 (e.g., by way of different entries in the file description metadata 144 for the same file with different time values 312) as an anomalous file. For example, if a file that was originally a Microsoft® Word document (e.g., with an "application/msword" MIME type 306) is replaced by a file with a compressed file (e.g., with an "application/zip" MIME type 306), the anomalous file detection module 406 may interpret that file as anomalous.

In an example embodiment, the anomalous file detection module 406 may employ natural language processing to compare the filenames 302 and file extensions 304 of multiple files (e.g., within a single client device 120, or across multiple client devices 120). On the basis of such processing, the anomalous file detection module 406 may determine that one or more new or updated files have filenames 302 and/or file extensions 304 that are different from those of other files in terms of characters, or groups of characters, that warrant the file being regarded as anomalous. For example, if a user of a client device 120 typically employs full or partial words, or dates, or other human-readable groups of characters for particular types of files, and a new file appears with the same file extension 304 but a filename 302 employing what appears to be a series of random alphanumeric characters, the anomalous file detection module 406 may regard such a file as an anomaly.

To determine that types of filenames 302 and file extensions 304 are typical, the anomalous file detection module 406, in an example embodiment, may employ natural language processing to identify file "clusters" having similar filename 302 and/or file extension 304 characteristics, and based on those clusters, identify other files that are some minimum distance from any such cluster as potentially anomalous.

Additionally, in some example embodiments, the anomalous file detection module 406 may employ techniques similar to those described above in conjunction with FIGS. 5 and 6 to further filter signals regarding anomalous files, such as by employing a time-based window and employing a threshold to generate anomalous file events, similar to the process illustrated in FIG. 5. Moreover, the anomalous file detection module 406 may determine whether anomalous file events across different client devices 120 are correlated in time, similar to the example of FIG. 6, to identify the anomalous files.

In some example embodiments, the processing performed by the anomalous backup activity detection module 402 and the anomalous backup activity correlation module 404 may occur in parallel (e.g., simultaneously, concurrently, or the like) to that of the anomalous file detection module 406, resulting in the identification of time-correlated backup activity anomalies and anomalous files in multiple client devices 120. The attack onset decision module 408, in an example embodiment, may be configured to make a determination as to whether a ransomware attack has begun against one or more of the client devices 120 based on the identified anomalous files and anomalous backup activity.

The attack onset decision module 408 may employ the anomalous backup activity and anomalous file information in different ways to determine whether a ransomware attack has begun. In an example embodiment, the attack onset decision module 408 may employ the identified anomalous files as an indicator of which client devices 120 may be undergoing a ransomware attack, and then determine whether the same client devices 120 were involved with anomalous backup activity. If so, the attack onset decision module 408 may determine that a ransomware attack is underway. In another example embodiment, the attack onset decision module 408 may also identify particular times of appearance of the identified anomalous files in addition to the particular client devices 120 on which they appear, and then compare those times and associated client devices 120 with the detected anomalous file backup activity. If the times and client devices 120 associated with the anomalous files correspond to the times and client devices 120 associated with the anomalous backup activities, the attack onset decision module 408 may determine that a ransomware attack has begun.

In other example embodiments, the attack onset decision module 408 may weight the information regarding the identified anomalous file backup activities and the information regarding the identified anomalous files to make a determination as to whether a ransomware attack has begun. Consequently, circumstances in which anomalous files appear on the same client devices 120 at approximately the same time that identified anomalous file backup activity has occurred may be more likely to result in a determination of a ransomware attack than if such the anomalous file backup activity and the anomalous files occur on the same client devices 120, but at different times. In these embodiments and others, the attack onset decision module 408 may employ the information regarding the existence of anomalous files as context in which the anomalous file backup activity determinations are analyzed.

As mentioned above, the ransomware attack onset detection module 150 may also include a restore data selection module 410 and an attack onset prevention module 412, which may perform their corresponding functions in response to a determination by the attack onset decision module 408 that the onset of a ransomware attack has occurred. In an example embodiment, for each client device 120 identified by the attack onset decision module 408 as being the target of a ransomware attack, the restore data selection module 410 may be configured to review previous versions of file backups stored in the backup/restore data store 116 to identify a backup that was made prior to the onset of the ransomware attack at the client device 120. In a particular example embodiment, the selected backup may be the most recent backup operation that was performed prior to the onset of the ransomware attack at the client device 120, as detected by the attack onset decision module 408. In an example embodiment, the ransomware attack onset detection module 150 may present an option to a user of the affected client device 120 (e.g., via a graphical user interface of the backup/restore client 122) as to whether to perform such a restore operation, and then perform the restore operation in response to an affirmative reply by the user. Such an operation may occur, for example, after the affected client device 120 has been restored to some pre-attack state (e.g., reformatting of data storage, reinstallation of an operating system and desired applications, and so on).

The attack onset prevention module 412, in an example embodiment, may be configured to prevent the detected ransomware attack from affecting a currently unaffected client device 120. To that end, the attack onset prevention module 412 may receive anomalous file information from the anomalous file detection module 406 or the attack onset decision module 408 that indicates the appearance of an executable file associated with the detected onset of the ransomware attack. In response, the attack onset prevention module 412 may further detect, by way of the file description metadata 144 of an unaffected client device 120, that the executable file is not present in the client device 120. As a result, the attack onset prevention module 412 may cause, by way of a separate anti-virus software application, firewall software, or other means, the prevention of the transfer of the executable file to other client devices 120 that have either not been the target of the ransomware attack, or have been rehabilitated from such an attack.

Figure 7:
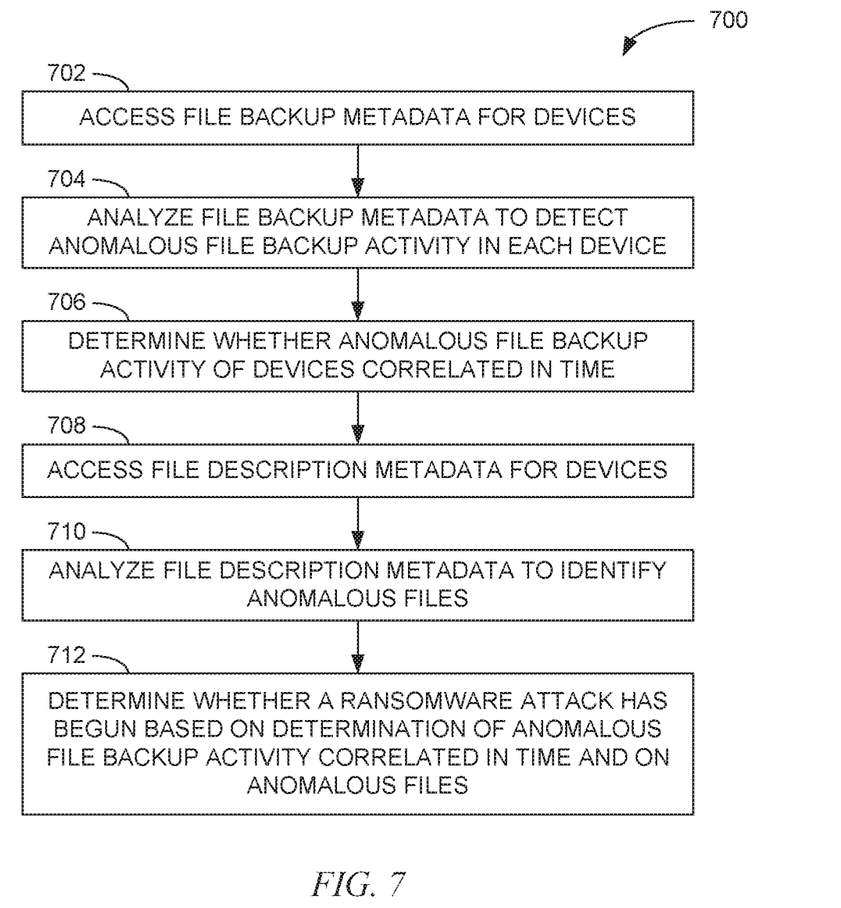
FIG. 7 is a flow diagram of an example method of detecting the onset of a ransomware attack.

FIG. 7 is a flow diagram of an example method 700 of detecting the onset of a ransomware attack. While the method 700 is presumed herein to be employed by the ransomware attack onset detection module 150 described above, the method 700 may be performed by other modules or systems in other example embodiments not specifically described herein.

In the method 700, file backup metadata 142 for multiple client devices 120 may be accessed (operation 702) and analyzed (e.g., via the anomalous backup activity detection module 402) to detect anomalous file backup activity in each client device 120 (operation 704). A determination may then be made (e.g., by the anomalous backup activity correlation module 404) whether detected anomalous file backup activity across multiple client devices 120 are correlated in time (operation 706). Also, file description metadata 144 for multiple client devices 120 may be accessed (operation 708) and analyzed (e.g., by the anomalous file detection module 406) to identify anomalous files in one or more of the client devices 120 (operation 710). A determination may then be made (e.g., by the attack onset decision module 408) whether a ransomware attack has begun based on the determination of anomalous file backup activity correlated in time and on the identified anomalous files (operation 712).

As illustrated in FIG. 7, the operations 702-712 of method 700, as well as the operations of other methods described herein, are presented in a particular order. However, various embodiments of the method 700 and others need not be limited in such a fashion. For example, the accessing of the file backup metadata 142 (operation 702) and the accessing of the file description metadata 144 (operation 708) may occur on a repetitive or continual basis for each of the client devices 120 as that data is generated by and for the operation of the backup engine 112. Consequently, the analysis of the file backup metadata 142 (operation 704) and the determination of whether anomalous file backup activity among multiple client devices 120 is correlated in time (operation 706) may occur in parallel with the analysis of the file description metadata 144 to identify anomalous files (operation 710). Moreover, the determination of whether a ransomware attack has begun (operation 712) may be made at any point in time as new information regarding anomalous file backup activities and anomalous files is made available.

Figure 8:
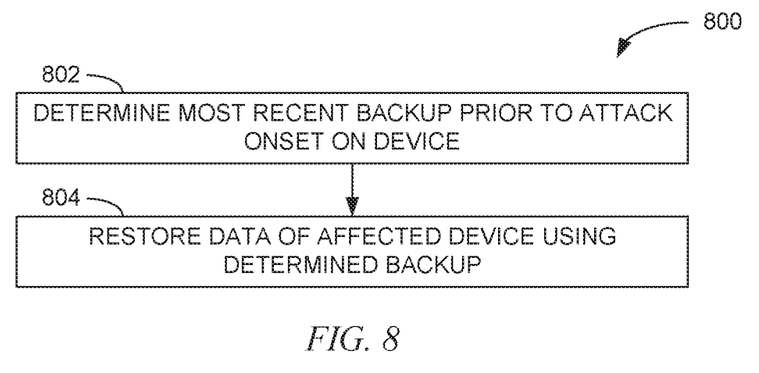
FIG. 8 is a flow diagram of an example method of restoring data to a client device in response to detecting the onset of a ransomware attack at the client device.

Once a determination is made that a ransomware attack has likely begun with respect to some client devices 120 (operation 712), actions may be undertaken in some example embodiments to enable restoration of those client devices 120 and/or to prevent the ransomware attack from affecting other client devices 120. FIG. 8 is a flow diagram of an example method 800 of restoring data to a client device 120 in response to detecting the onset of a ransomware attack at that client device 120. In the method 800, for each client device 120 identified by the attack onset decision module 408 as being the target of a ransomware attack, previous versions of file backups (e.g., backups stored in the backup/restore data store 116) may be reviewed (e.g., by the restore data selection module 410) to identify a backup that was made prior to the onset of the ransomware attack at the client device 120. The restore data selection module 410 may be configured to review previous versions of file backups stored in the backup/restore data store 116 to identify a backup that was made prior to the onset of the ransomware attack at the client device 120 (operation 802), such as the most recent backup prior to the onset of the attack. The identified backup of interest may then be used to restore the data of the client device 120 (operation 804), such as after the affected client device 120 has been restored to a pre-attack state, as mentioned above.

Figure 9:
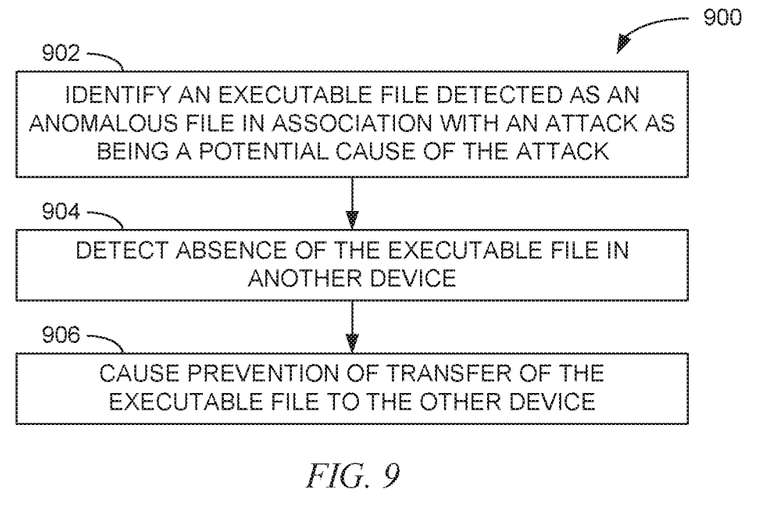
FIG. 9 is a flow diagram of an example method of preventing a detected ransomware attack from affecting a client device.

FIG. 9 is a flow diagram of an example method of preventing a ransomware attack from affecting another client device 120. In the method 900, anomalous file information may be reviewed (e.g., by the anomalous file detection module 406 or the attack onset decision module 408) to determine that an executable file identified as an anomalous file associated with the detected onset of the ransomware attack is a potential cause of the attack (operation 902). In an example embodiment, the appearance of the executable file in multiple client devices 120 just prior to the onset of an attack in most or all of those client devices 120 may indicate that the executable file was the cause of the attack. In response to such an identification, file description metadata 144 associated with another client device 120 that has either not been the target of the attack, or was rehabilitated after such an attack, may be analyzed (e.g., by the attack onset prevention module 412) to determine that the executable is not present in that client device 120 (operation 904). As a result, transfer of the executable file to the unaffected client device 120 may then be prevented (operation 906), such as by way of communication from the attack onset prevention module 412 to a separate anti-virus software application, firewall software, or the like.

Figure 10:
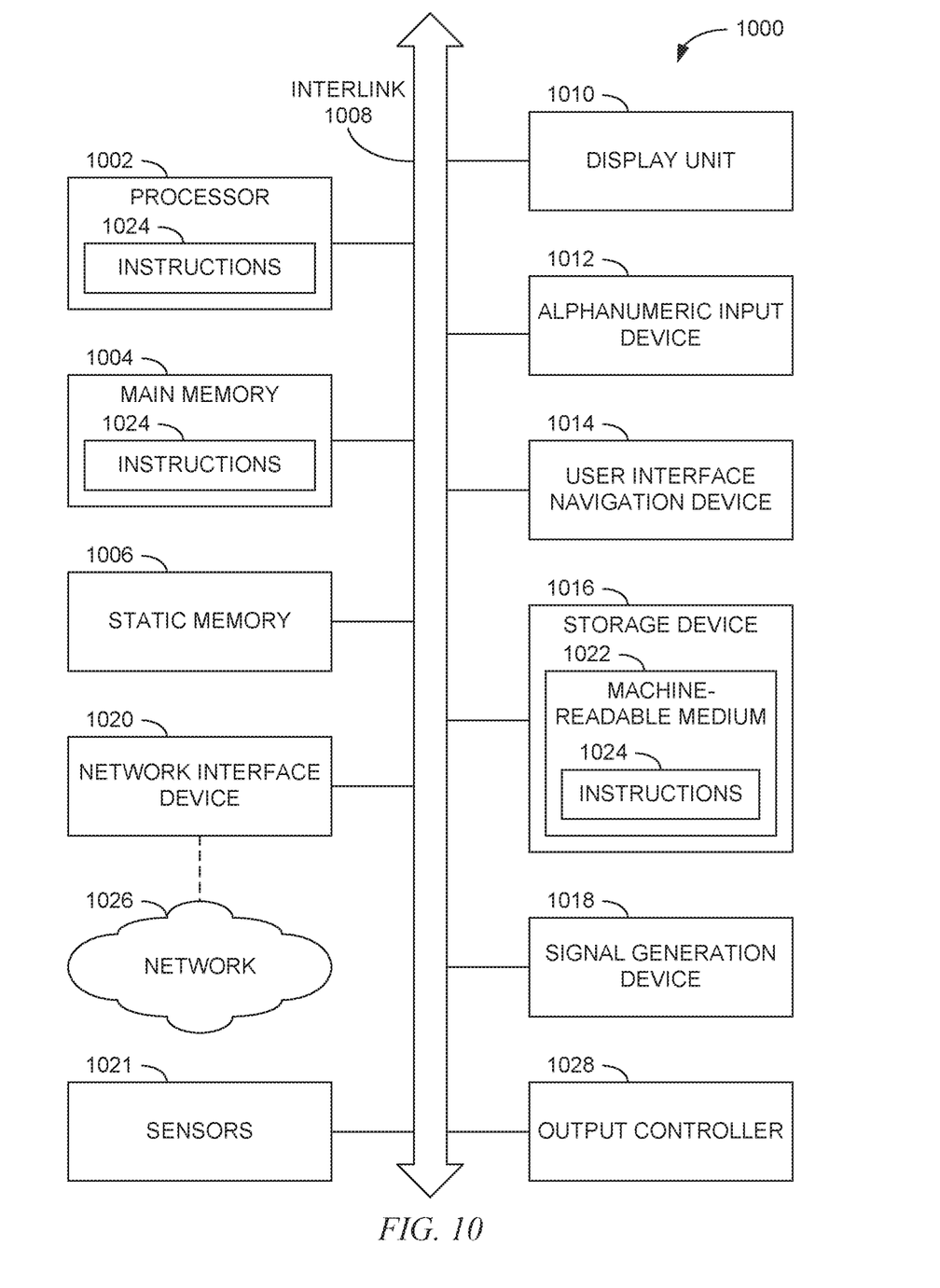
FIG. 10 is a block diagram of a machine in the form of a computer system within which a set of instructions may be executed for causing the machine to perform any one or more of the methodologies discussed herein, according to an example embodiment.

FIG. 10 illustrates a block diagram of an example machine 1000 upon which any one or more of the techniques (e.g., methodologies) discussed herein may perform. In alternative embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in peer-to-peer (P2P) (or other distributed) network environment. The machine 1000 may be, or be a part of, a computing device (e.g., client device 120), the backup/restore system 110 of FIG. 1, a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Machine 1000, or combinations of such machines 1000, may implement the methods 700, 800, 900 of FIGS. 7, 8, and 9, as well as others described herein. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, applications, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 1000 may include a hardware processor 1002 (e.g., a central processing unit (CPU), a graphics processing unit (GPU), a hardware processor core, or any combination thereof), a main memory 1004 and a static memory 1006, some or all of which may communicate with each other via an interlink (e.g., bus) 1008. The machine 1000 may further include a display unit 1010, an alphanumeric input device 1012 (e.g., a keyboard), and a user interface (UI) navigation device 1014 (e.g., a mouse). In an example, the display unit 1010, input device 1012 and UI navigation device 1014 may be a touch screen display. The machine 1000 may additionally include a storage device (e.g., drive unit) 1016, a signal generation device 1018 (e.g., a speaker), a network interface device 1020, and one or more sensors 1021, such as a global positioning system (GPS) sensor, compass, accelerometer, or other sensor. The machine 1000 may include an output controller 1028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1016 may include a machine readable medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within static memory 1006, or within the hardware processor 1002 during execution thereof by the machine 1000. In an example, one or any combination of the hardware processor 1002, the main memory 1004, the static memory 1006, or the storage device 1016 may constitute machine-readable media.

While the machine readable medium 1022 is illustrated as a single medium, the term "machine-readable medium" may include a single medium or multiple media (e.g., a centralized or distributed database, and/or associated caches and servers) configured to store the one or more instructions 1024.

The term "machine-readable medium" may include any medium that is capable of storing, encoding, or carrying instructions 1024 for execution by the machine 1000 and that cause the machine 1000 to perform any one or more of the techniques of the present disclosure, or that is capable of storing, encoding or carrying data structures used by or associated with such instructions 1024. Non-limiting machine-readable medium examples may include solid-state memories, and optical and magnetic media. Specific examples of machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine-readable media may include machine-readable media that is not a transitory propagating signal.

The instructions 1024 may further be transmitted or received over a communications network 1026 using a transmission medium via the network interface device 1020. The machine 1000 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMAX®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1020 may include one or more physical jacks (e.g., Ethernet, coaxial, or phone jacks) or one or more antennas to connect to the communications network 1026. In an example, the network interface device 1020 may include a plurality of antennas to wirelessly communicate using at least one of single-input multiple-output (SIMO), multiple-input multiple-output (MIMO), or multiple-input single-output (MISO) techniques. In some examples, the network interface device 1020 may wirelessly communicate using Multiple User MIMO techniques.

OTHER NOTES AND EXAMPLES

Example 1 is a method for detecting a ransomware attack, the method comprising accessing file backup metadata for each of a plurality of computing devices; analyzing, using at least one hardware processor of a machine, the file backup metadata to detect anomalous file backup activity of individual ones of the plurality of computing devices; determining whether the detected anomalous file backup activity of at least some of the plurality of computing devices is correlated in time; accessing file description metadata for each of the computing devices; analyzing the file description metadata to identify files in the plurality of computing devices that are anomalous to other files in the plurality of computing devices; and determining whether a ransomware attack has begun based on the determination whether the detected anomalous file backup activity of at least some of the plurality of computing devices is correlated in time, and based on the identified anomalous files.

In Example 2, the subject matter of Example 1 optionally includes the plurality of computing devices corresponding to a single organization.

In Example 3, the subject matter of any one or more of Examples 1 and 2 optionally include the file backup metadata for each of the plurality of computing devices comprising at least one of a number of files selected for a backup operation and a size of the files selected for a backup operation.

In Example 4, the subject matter of any one or more of Examples 1-3 optionally include the analyzing of the file backup metadata comprising employing a separate one or more machine learning models for each of the plurality of computing devices.

In Example 5, the subject matter of any one or more of Examples 1-4 optionally include at least one of the separate one or more machine learning models comprising a time-series model.

In Example 6, the subject matter of any one or more of Examples 1-5 optionally include the anomalous file backup activity comprising a change in file backup activity of a file backup operation compared to a plurality of other file backup operations exceeding a predetermined threshold.

In Example 7, the subject matter of any one or more of Examples 1-6 optionally include the change in file backup activity comprising one of an increase in a total number of new files backed up, an increase in a total size of new files backed up, an increase in a total number of previously existing files backed up, an increase in a total size of previously existing files backed up, a decrease in the total number of files backed up, and a decrease in the total size of files backed up.

In Example 8, the subject matter of any one or more of Examples 1-7 optionally include the determining whether the detected anomalous file backup activity of at least some of the plurality of computing devices is correlated in time comprising performing cohort analysis of the detected anomalous file backup activity.

In Example 9, the subject matter of any one or more of Examples 1-8 optionally include the file description metadata comprising at least one of a filename, a file extension, a file MIME type, a file size, a file hash, and a time of file creation, reading, updating, and deletion.

In Example 10, the subject matter of any one or more of Examples 1-9 optionally include the analyzing of the file description metadata comprising applying a natural language processing algorithm to the file description metadata, and at least one of the files is identified as anomalous based on a distance of the at least one of the files from a cluster of other files on the same computing device.

In Example 11, the subject matter of any one or more of Examples 1-10 optionally include the analyzing of the file description metadata comprising identifying a first file on a first one of the plurality of computing devices as being anomalous based on the first file having a same filename and at least one of a different file extension and a different file MIME type as a second file on a second one of the plurality of computing devices that has been identified as anomalous.

In Example 12, the subject matter of any one or more of Examples 1-11 optionally include the determining whether a ransomware attack has begun being further based on a correlation in time of an appearance of the identified anomalous files to the detected anomalous file backup activity.

In Example 13, the subject matter of any one or more of Examples 1-12 optionally include the determining whether the detected anomalous file backup activity of at least some of the plurality of computing devices is correlated in time is based on the detected anomalous file backup activity of the at least some of the plurality of computing devices occurring within a predetermined length of time.

In Example 14, the subject matter of any one or more of Examples 1-13 optionally include the file description data of at least one of the plurality of computing devices having been generated during a file search operation to determine a scope of a file backup operation to be performed on the at least one of the plurality of computing devices.

In Example 15, the subject matter of any one or more of Examples 1-14 optionally include for each of at least one of the plurality of computing devices: determining an earliest point in time at which the ransomware attack began; and identifying a previous file backup operation occurring prior to the earliest point in time.

In Example 16, the subject matter of any one or more of Examples 1-15 optionally include the identifying of the previous file backup operation comprising identifying a most recent file backup operation of a plurality of previous file backup operations occurring prior to the earliest point in time.

In Example 17, the subject matter of any one or more of Examples 1-16 optionally include for each of the at least one of the plurality of computing devices, initiating a restore operation using saved file data generated by the identified previous file backup operation.

In Example 18, the subject matter of any one or more of Examples 1-17 optionally include detecting an appearance of an executable file in at least one of the plurality of computing devices in conjunction with at least one of the detected anomalous file backup activity and the identified anomalous files; and identifying the executable file as being associated with the ransomware attack based on the appearance of the executable file.

In Example 19, the subject matter of any one or more of Examples 1-18 optionally include detecting an absence of the executable file in another of the plurality of computing devices; and causing prevention of a transfer of the executable file to the other of the plurality of computing devices in response to the detecting of the absence of the executable file in the other of the plurality of computing devices.

Example 20 is a system comprising one or more hardware processors; and a memory storing instructions that, when executed by at least one of the one or more hardware processors, causes the system to perform operations comprising accessing file backup metadata for each of a plurality of computing devices; analyzing the file backup metadata to detect anomalous file backup activity of individual ones of the plurality of computing devices; determining whether the detected anomalous file backup activity of at least some of the plurality of computing devices is correlated in time; accessing file description metadata for each of the computing devices; analyzing the file description metadata to identify files in the plurality of computing devices that are anomalous to other files in the plurality of computing devices; and determining whether a ransomware attack has begun based on the determination whether the detected anomalous file backup activity of at least some of the plurality of computing devices is correlated in time, and based on the identified anomalous files.

Example 21 is a non-transitory computer-readable storage medium comprising instructions that, when executed by one or more hardware processors of a system, cause the system to perform operations comprising accessing file backup metadata for each of a plurality of computing devices; analyzing the file backup metadata to detect anomalous file backup activity of individual ones of the plurality of computing devices; determining whether the detected anomalous file backup activity of at least some of the plurality of computing devices is correlated in time; accessing file description metadata for each of the computing devices; analyzing the file description metadata to identify files in the plurality of computing devices that are anomalous to other files in the plurality of computing devices; and determining whether a ransomware attack has begun based on the determination whether the detected anomalous file backup activity of at least some of the plurality of computing devices is correlated in time, and based on the identified anomalous files.

What is claimed is:

1. A method for detecting a ransomware attack, the method comprising:
    accessing file backup metadata for three or more computing devices;
    analyzing, using at least one hardware processor of a machine, the file backup metadata to detect anomalous file backup activity for each of the computing devices of the three or more computing devices;
    identifying, based on the analyzing, a respective detected anomalous file backup activity for each of the computing devices, wherein each detected anomalous file backup activity has an associated detected time;
    determining whether the associated detected time of the detected anomalous file backup activity for a first computing device of the computing devices is within a predetermined time period of the associated detected time of the detected anomalous file backup activity for a second computing device of the computing devices;
    determining whether the associated detected time of the detected anomalous file backup activity for the second computing device is within the predetermined time period of the associated detected time of the detected anomalous file backup activity for a third computing device of the computing devices;

in response to determining that the associated detected time of the detected anomalous file backup activity for the first computing device is within the predetermined time period of the associated detected time of the detected anomalous file backup activity for the second computing device and that the associated detected time of the detected anomalous file backup activity for the second computing device is within the predetermined time period of the associated detected time of the detected anomalous file backup activity for the third computing device, determining that the detected anomalous file backup activity for the first, second, and third computing devices are correlated in time;

accessing file description metadata for each of the computing devices;

analyzing the file description metadata to identify files in the three or more computing devices that are anomalous to other files in the three or more computing devices; and determining whether a ransomware attack has begun based on the determination whether the detected anomalous file backup activity of the three or more computing devices is correlated in time, and based on the identified anomalous files.

2. The method of claim 1, the three or more computing devices corresponding to a single organization.

3. The method of claim 1, the file backup metadata for each of the three or more computing devices comprising at least one of a number of files selected for a backup operation and a size of the files selected for a backup operation.

4. The method of claim 1, the analyzing of the file backup metadata comprising employing a separate one or more machine learning models for each of the three or more computing devices.

5. The method of claim 4, at least one of the separate one or more machine learning models comprising a time-series model.

6. The method of claim 1, the anomalous file backup activity comprising a change in file backup activity of a file backup operation compared to a plurality of other file backup operations exceeding a predetermined threshold.

7. The method of claim 6, the change in file backup activity comprising one of an increase in a total number of new files backed up, an increase in a total size of new files backed up, an increase in a total number of previously existing files backed up, an increase in a total size of previously existing files backed up, a decrease in the total number of files backed up, and a decrease in the total size of files backed up.

8. The method of claim 1, the determining whether the detected anomalous file backup activity of the three or more computing devices is correlated in time comprising performing cohort analysis of the detected anomalous file backup activity.

9. The method of claim 1, the file description metadata comprising at least one of a filename, a file extension, a file MIME type, a file size, a file hash, and a time of file creation, reading, updating, and deletion.

10. The method of claim 1, the analyzing of the file description metadata comprising applying a natural language processing algorithm to the file description metadata, and at least one of the files is identified as anomalous based on a distance of the at least one of the files from a cluster of other files on one of the computing devices.

11. The method of claim 1, the analyzing of the file description metadata comprising identifying a first file on a first one of the three or more computing devices as being anomalous based on the first file having a same filename and at least one of a different file extension and a different file MIME type as a second file on a second one of the three or more computing devices that has been identified as anomalous.

12. The method of claim 1, the determining whether a ransomware attack has begun being further based on a correlation in time of an appearance of the identified anomalous files to the detected anomalous file backup activity.

13. The method of claim 1, the determining whether the detected anomalous file backup activity of at least some of the three or more computing devices is correlated in time is based on the detected anomalous file backup activity of the at least some of the three or more computing devices occurring within a predetermined length of time.

14. The method of claim 1, the file description metadata of at least one of the three or more computing devices having been generated during a file search operation to determine a scope of a file backup operation to be performed on the at least one of the three or more computing devices.

15. The method of claim 1, further comprising:
for each of the three or more computing devices:
determining an earliest point in time at which the ransomware attack began; and
identifying a previous file backup operation occurring prior to the earliest point in time.

16. The method of claim 15, the identifying of the previous file backup operation comprising identifying a most recent file backup operation of a plurality of previous file backup operations occurring prior to the earliest point in time.

17. The method of claim 15, further comprising:
for each of the three or more computing devices: initiating a restore operation using saved file data generated by the identified previous file backup operation.

18. The method of claim 1, further comprising:
detecting an appearance of an executable file in at least one of the three or more computing devices in conjunction with at least one of the detected anomalous file backup activity and the identified anomalous files; and
identifying the executable file as being associated with the ransomware attack based on the appearance of the executable file.

19. The method of claim 18, further comprising:
detecting an absence of the executable file in another of the three or more computing devices; and
causing prevention of a transfer of the executable file to the other of the three or more computing devices in response to the detecting of the absence of the executable file in the other of the three or more computing devices.

20. A system comprising:
one or more hardware processors; and
a memory storing instructions that, when executed by at least one of the one or more hardware processors, causes the system to perform operations comprising:
accessing file backup metadata for three or more computing devices;
analyzing the file backup metadata to detect anomalous file backup activity for each of the computing devices of the three or more computing devices;
identifying, based on the analyzing, a respective detected anomalous file backup activity for each of the computing devices, wherein each detected anomalous file backup activity has an associated detected time;

determining whether the associated detected time of the detected anomalous file backup activity for a first computing device of the computing devices is within a predetermined time period of the associated detected time of the detected anomalous file backup activity for a second computing device of the computing devices;

determining whether the associated detected time of the detected anomalous file backup activity for the second computing device is within the predetermined time period of the associated detected time of the detected anomalous file backup activity for a third computing device of the computing devices;

in response to determining that the associated detected time of the detected anomalous file backup activity for the first computing device is within the predetermined time period of the associated detected time of the detected anomalous file backup activity for the second computing device and that the associated detected time of the detected anomalous, file backup activity for the second computing device is within the predetermined time period of the associated detected time of the detected anomalous file backup activity for the third computing device, determining that the detected anomalous file backup activity for the first, second, and third computing devices are correlated in time;

accessing file description metadata for each of the computing devices;

analyzing the file description metadata to identify files in the three or more computing devices that are anomalous to other files in the three or more computing devices; and determining whether a ransomware attack has begun based on the determination whether the detected anomalous file backup activity of at least some of the three or more computing devices is correlated in time, and based on the identified anomalous files.

21. A non-transitory computer-readable storage medium comprising instructions that, when executed by one or more hardware processors of a system, cause the system to perform operations comprising:

accessing file backup metadata for three or more computing devices;

analyzing the file backup metadata to detect anomalous file backup activity for each of the computing devices of the three or more computing devices;

identifying, based on the analyzing, a respective detected anomalous file backup activity for each of the computing devices, wherein each detected anomalous file backup activity has an associated detected time;

determining whether the associated detected time of the detected anomalous file backup activity for a first computing device of the computing devices is within a predetermined time period of the associated detected time of the detected anomalous file backup activity for a second computing device of the computing devices:

determining whether the associated detected time of the detected anomalous file backup activity for the second computing device is within the predetermined time period of the associated detected time of the detected anomalous file backup activity for a third computing device of the computing devices;

in response to determining that the associated detected time of the detected anomalous file backup activity for the first computing device is within the predetermined time period of the associated detected time of the detected anomalous file backup activity for the second computing device and that the associated detected time of the detected anomalous file backup activity for the second computing device is within the predetermined time period of the associated detected time of the detected anomalous file backup activity for the third computing device, determining that the detected anomalous file backup activity for the first, second, and third computing devices are correlated in time;

accessing file description metadata for each of the computing devices;

analyzing the file description metadata to identify files in the three or more computing devices that are anomalous to other files in the three or more computing devices; and determining whether a ransomware attack has begun based on the determination whether the detected anomalous file backup activity of at least some of the three or more computing devices is correlated in time, and based on the identified anomalous files.

\* \* \* \* \*